United States Patent
Hwang et al.

(10) Patent No.: US 9,453,149 B2
(45) Date of Patent: Sep. 27, 2016

(54) ADHESIVE, ADHESIVE TAPE, AND DISPLAY DEVICE

(71) Applicants: Hyeon-Deuk Hwang, Yongin (KR); Dong-Hyuk Lim, Seoul (KR); Myung-Jae Jung, Seoul (KR)

(72) Inventors: Hyeon-Deuk Hwang, Yongin (KR); Dong-Hyuk Lim, Seoul (KR); Myung-Jae Jung, Seoul (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 0 days.

(21) Appl. No.: 13/740,618

(22) Filed: Jan. 14, 2013

(65) Prior Publication Data

US 2014/0017451 A1    Jan. 16, 2014

(30) Foreign Application Priority Data

Jul. 16, 2012   (KR) .................. 10-2012-0077335

(51) Int. Cl.
| | | |
|---|---|---|
| C09J 7/00 | (2006.01) | |
| C09J 133/02 | (2006.01) | |
| C09J 133/08 | (2006.01) | |
| C08K 5/1515 | (2006.01) | |
| C09K 5/18 | (2006.01) | |
| C09J 7/02 | (2006.01) | |
| C08K 5/18 | (2006.01) | |

(52) U.S. Cl.
CPC ............. *C09J 133/08* (2013.01); *C09J 7/00* (2013.01); *C09J 7/0246* (2013.01); *C09J 133/02* (2013.01); *C08K 5/1515* (2013.01); *C08K 5/18* (2013.01); *C09J 2203/318* (2013.01); *C09J 2205/102* (2013.01); *C09J 2433/00* (2013.01); *Y10T 428/24612* (2015.01); *Y10T 428/24959* (2015.01); *Y10T 428/2848* (2015.01); *Y10T 428/2891* (2015.01)

(58) Field of Classification Search
CPC ....................................................... C08F 22/16
See application file for complete search history.

(56) References Cited

U.S. PATENT DOCUMENTS

| | | | | |
|---|---|---|---|---|
| 4,359,564 A | * | 11/1982 | Merritt et al. | 526/260 |
| 4,965,117 A | | 10/1990 | Lautenschlaeger et al. | |
| 5,194,550 A | * | 3/1993 | Rance et al. | 526/318.25 |
| 5,334,686 A | * | 8/1994 | Ando et al. | 526/307.7 |
| 5,397,614 A | | 3/1995 | Patnode et al. | |
| 6,353,066 B1 | * | 3/2002 | Sosa | 526/224 |
| 6,689,441 B1 | * | 2/2004 | Kim | 428/40.1 |
| 6,995,193 B1 | * | 2/2006 | Fukui | 522/102 |
| 7,070,051 B2 | * | 7/2006 | Kanner et al. | 206/382 |

(Continued)

FOREIGN PATENT DOCUMENTS

| | | |
|---|---|---|
| CN | 101394996 A | 3/2009 |
| CN | 101600771 A | 12/2009 |

(Continued)

OTHER PUBLICATIONS

Machine translatio of JP 2000008013 A (2000).*

(Continued)

*Primary Examiner* — Frank D Ducheneaux
(74) *Attorney, Agent, or Firm* — Lee & Morse, P.C.

(57) ABSTRACT

An adhesive includes an acrylic copolymer synthesized from a composition including a solution polymerizable acryl-based monomer, a vinyl-based monomer that is copolymerizable with the solution polymerizable acryl-based monomer, a β-carboxylethyl acrylate monomer, and a reaction initiator, and a compound including at least three epoxy functional groups.

15 Claims, 15 Drawing Sheets

(56) References Cited

U.S. PATENT DOCUMENTS

| | | | |
|---|---|---|---|
| 2001/0019766 A1* | 9/2001 | Masuda et al. | 428/345 |
| 2006/0234074 A1* | 10/2006 | Yun et al. | 428/500 |
| 2009/0250109 A1 | 10/2009 | Hasegawa | |
| 2010/0182679 A1* | 7/2010 | Han et al. | 359/359 |
| 2010/0279491 A1* | 11/2010 | Kiuchi et al. | 438/464 |
| 2012/0059127 A1* | 3/2012 | Ha et al. | 525/327.2 |
| 2012/0064347 A1* | 3/2012 | Kita et al. | 428/402.24 |

FOREIGN PATENT DOCUMENTS

| | | |
|---|---|---|
| JP | 06-306336 | 11/1994 |
| JP | 2000-008013 A | 1/2000 |
| KR | 1996-7003998 | 8/1996 |
| KR | 10-2006-0108515 A | 10/2006 |
| KR | 10-2007-0116844 A | 12/2007 |
| KR | 10-2008-0024258 A | 3/2008 |
| KR | 10-2008-0072364 A | 8/2008 |
| KR | 10-2010-0094062 A | 8/2010 |
| KR | 10-2010-0100307 A | 9/2010 |
| KR | 10-2012-0012706 A | 2/2012 |
| TW | 200846434 | 1/1997 |

OTHER PUBLICATIONS

Aldrich Data Sheet (2013).*
BASF data sheet (2014).*
European Search Report in EP 13160058.7-1302, dated Nov. 11, 2013 (Hwang, et al.).

* cited by examiner

ADHESIVE, ADHESIVE TAPE, AND DISPLAY DEVICE

CROSS-REFERENCE TO RELATED APPLICATION

This application claims priority under 35 U.S.C. §119 to Korean Patent Application No. 10-2012-0077335, filed in the Korean Intellectual Property Office on Jul. 16, 2012, and entitled: "ADHESIVE, ADHESIVE TAPE, AND DISPLAY DEVICE," the entire contents of which is hereby incorporated by reference.

BACKGROUND

Embodiments relate to an adhesive, an adhesive tape, and a display device.

SUMMARY

Embodiments are directed to an adhesive including an acrylic copolymer synthesized from a composition including a solution polymerizable acryl-based monomer, a vinyl-based monomer that is copolymerizable with the solution polymerizable acryl-based monomer, a β-carboxylethyl acrylate monomer, and a reaction initiator, and a compound including at least three epoxy functional groups.

The β-carboxylethyl acrylate monomer may include a compound represented by Chemical Formula 1:

[Chemical Formula 1]

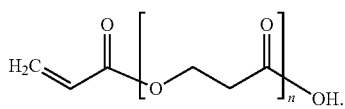

In Chemical Formula 1, n may be an integer ranging from about 2 to about 12.

The β-carboxylethyl acrylate monomer may include a first β-carboxylethyl acrylate monomer represented by Chemical Formula 1 and a second β-carboxylethyl acrylate monomer represented by Chemical Formula 1, and the first and second β-carboxylethyl acrylate monomers may have different values for n.

The compound including at least three epoxy functional groups may include a triglycidyl p-aminophenol, an N,N,N',N'-tetraglycidyl-m-xylenediamine compound represented by Chemical Formula 2, a compound represented by Chemical Formula 3, or a combination thereof:

[Chemical Formula 2]

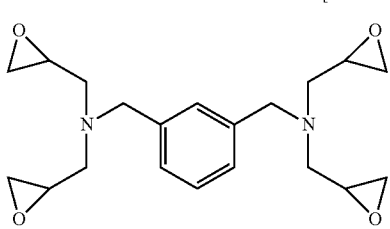

[Chemical Formula 3]

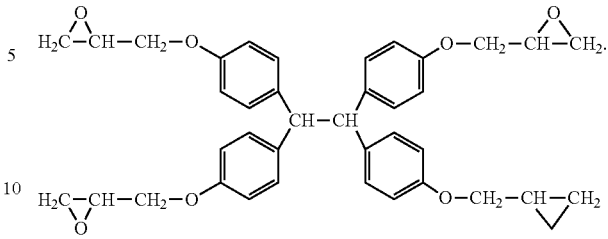

The β-carboxylethyl acrylate monomer may be included in an amount of about 1 to about 10 parts by weight based on 100 parts by weight of a total amount of monomers.

The compound including at least three epoxy functional groups may be included in an amount of about 0.1 to about 10 parts by weight based on 100 parts by weight of a total amount of monomers.

The solution polymerizable acryl-based monomer may be included in an amount of about 70 to about 90 parts by weight based on 100 parts by weight of a total amount of monomers, the vinyl-based monomer may be included in an amount of about 1 to about 10 parts by weight based on 100 parts by weight of a total amount of monomers, and the reaction initiator may be included in an amount of about 0.1 to about 5 parts by weight based on 100 parts by weight of a total amount of monomers.

The solution polymerizable acryl-based monomer may include 2-ethylhexyl acrylate, 2-methylbutyl acrylate, isooctyl acrylate, lauryl acrylate, n-butyl acrylate, n-hexyl acrylate, n-octyl acrylate, n-decyl acrylate, isodecyl acrylate, or a combination thereof.

The vinyl-based monomer may include vinyl acetate, ethyl acrylate, methyl methacrylate, styrene, (meth)acrylic acid, hydroxyl ethyl acrylate, (meth)acrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, N-octyl acrylamide, itaconic acid, crotonic acid, maleic acid, fumaric acid, 2,2-(diethoxy)ethyl acrylate, 2-hydroxyethyl (meth)acrylate, 3-hydroxypropyl (meth)acrylate, methyl (meth)acrylate, isobonyl acrylate, 2-(phenoxy)ethyl (meth)acrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, or a combination thereof.

The composition may further include a heat resistance-improving monomer, a cross-linking monomer, and an elasticity-controlling monomer, the heat resistance-improving monomer may be included in an amount of about 1 to about 10 parts by weight based on 100 parts by weight of a total amount of monomers, the cross-linking monomer may be included in an amount of about 1 to about 15 parts by weight based on 100 parts by weight of a total amount of monomers, and the elasticity-controlling monomer may be included in an amount of about 1 to about 15 parts by weight based on 100 parts by weight of a total amount of monomers.

The acryl-based copolymer may have a weight average molecular weight of about 500,000 to about 1,500,000.

Embodiments are also directed to an adhesive tape including an adhesive layer including the adhesive.

The adhesive tape may further include a substrate layer, a printing layer, or a combination thereof beneath or on the adhesive layer.

The adhesive layer may have an embossed surface.

The adhesive layer may have a thickness ranging from about 3 μm to about 85 μm, and the adhesive tape may have a total thickness ranging from about 20 μm to about 100 μm.

The adhesive layer may have a peeling strength of greater than or equal to about 500 gf.

The adhesive layer may have an initial adhesive strength of greater than or equal to about 100 gf under a pressure condition of about 100 gf/1 sec, and greater than or equal to about 300 gf under a pressure condition of about 500 gf/3 sec.

Embodiments are also directed to a display device, including a display panel, and the adhesive tape on one side of the display panel.

The adhesive tape may be positioned on a rear side of the display panel.

The display device may be an organic light emitting diode (OLED) display.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
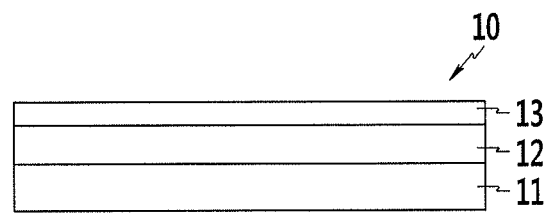
FIGS. 1, 2, and 3 illustrate cross-sectional views of stacked structures of an adhesive tape according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. As those skilled in the art would realize, the described embodiments may be modified in various different ways, all without departing from the spirit or scope of this disclosure.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. Further, it will be understood that when a layer or element is referred to as being "under" another layer or element, it can be directly under, and one or more intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like layers or elements throughout.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations in addition to the orientation depicted in the figures. Thus, the exemplary term "below" can encompass both an orientation of above and below.

An adhesive according to an embodiment may include an acrylic copolymer synthesized from a composition including a solution-polymerizable acryl-based monomer, a vinyl-based monomer that is copolymerizable with the solution-polymerizable acryl-based monomer, a β-carboxylethyl acrylate monomer, and a reaction initiator, and a compound including at least three epoxy functional groups.

The solution polymerizable acryl-based monomer may be solution-polymerizable and adhesive, and may include, for example, 2-ethylhexyl acrylate, 2-methylbutyl acrylate, isooctyl acrylate, lauryl acrylate, n-butyl acrylate, n-hexyl acrylate, n-octyl acrylate, n-decyl acrylate, isodecyl acrylate, or a combination thereof, but is not limited thereto.

The solution polymerizable acryl-based monomer may be included in an amount of about 70 to about 90 parts by weight based on 100 parts by weight of the total monomers.

The vinyl-based monomer may be a monomer capable of being copolymerized with the solution-polymerizable acryl-based monomer and may include, for example, vinyl acetate, methyl methacrylate, styrene, (meth)acrylic acid, hydroxyl ethyl acrylate, (meth)acrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, N-octyl acrylamide, itaconic acid, crotonic acid, maleic acid, fumaric acid, 2,2-(diethoxy)ethyl acrylate, 2-hydroxyethyl (meth)acrylate, 3-hydroxypropyl (meth)acrylate, methyl (meth)acrylate, isobonyl acrylate, 2-(phenoxy)ethyl (meth) acrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, or a combination thereof, but is not limited thereto.

The vinyl-based monomer may be included in an amount of about 1 to about 10 parts by weight based on 100 parts by weight of the total monomers.

The β-carboxylethyl acrylate monomer may be a compound represented by the following Chemical Formula 1.

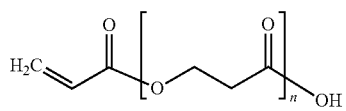

[Chemical Formula 1]

In Chemical Formula 1, n may be an integer ranging from about 2 to about 12, and, for example, 2 to 6.

The β-carboxylethyl acrylate monomer may include two different kinds of compounds represented by the above Chemical Formula 1, where the two different kinds of compounds have at least two different n values.

The composition may include the β-carboxylethyl acrylate monomer, and thus may improve the composition's adhesion to a subject desired to be adhered to and may form an effective cross-linking structure. In particular, the P-carboxylethyl acrylate monomer represented by the above Chemical Formula 1 may include a chain-shaped carboxyl group repeatedly including an ester group, and thus may improve adhesive strength.

The β-carboxylethyl acrylate monomer may be included in an amount of about 1 to about 10 parts by weight based on 100 parts by weight of the total monomers.

The reaction initiator may be, for example, a thermal initiator, a photoinitiator, or a combination thereof. The thermal initiator may be decomposed by heat and may form a radical, which may initiate a synthesis reaction. The thermal initiator may be, for example, benzoyl peroxide, acetyl peroxide, dilauryl peroxide, hydrogen peroxide, potassium persulfonate, or a combination thereof, but is not limited thereto.

The reaction initiator may be included in an amount of about 0.1 to about 5 parts by weight based on 100 parts by weight of the total monomers.

The composition may include one or more additives depending on the purpose of an adhesive.

The composition may further include, for example, a heat resistance-improving monomer, a cross-linking monomer, and/or an elasticity-controlling monomer. The heat resistance-improving monomer may be an additive for improving heat resistance of the adhesive, and may include, for example, itaconic acid, crotonic acid, maleic acid, fumaric acid, or a combination thereof, but is not limited thereto. The cross-linking monomer may be an additive for improving a polymerization degree, and may include, for example, acrylic acid, glycidylmethacrylate, or a combination thereof, but is not limited thereto. The elasticity-controlling monomer may be an additive for improving the elasticity of the adhesive, and may include, for example, 2-hydroxy ethyl-acetate, 2-methylbutyl acrylate, isooctyl acrylate, lauryl acrylate, n-butyl acrylate, n-hexyl acrylate, n-octyl acrylate, n-decyl acrylate, isodecyl acrylate, or a combination thereof, but is not limited thereto.

The heat resistance-improving monomer, the cross-linking monomer, and the elasticity-controlling monomer each may be included in an amount of about 1 to 10 parts by weight, about 1 to 15 parts by weight, and about 1 to 15 parts by weight, respectively, based on 100 parts by weight of the total monomers.

Other than the aforementioned monomers, the additive may include, for example, a processibility assistant, an anti-oxidizing agent, a stabilizer, a filler, a leveling agent, an antifoaming agent, a UV absorber, an antistatic agent, or a combination thereof, but is not limited thereto.

The composition may be prepared into an acrylic copolymer through polymerization. The acrylic copolymer may have a weight average molecular weight ranging from about 500,000 to about 1,500,000.

The compound including at least three epoxy functional groups may be a suitable compound having at least three epoxy functional groups without limitation, and may be, for example, triglycidyl p-aminophenol, an N,N,N',N'-tetraglycidyl-m-xylenediamine compound represented by the following Chemical Formula 2, a compound represented by the following Chemical Formula 3, or a combination thereof

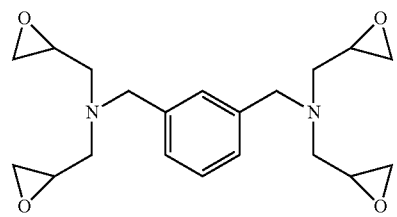

[Chemical Formula 2]

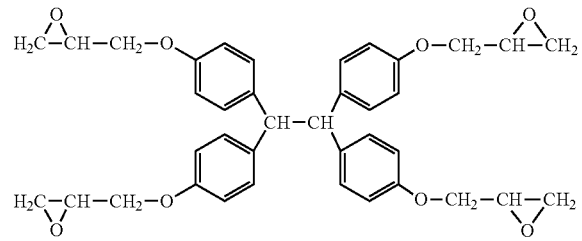

[Chemical Formula 3]

The adhesive may include the compound including at least three epoxy functional groups, and thus may improve internal agglomerative strength.

The compound including at least three epoxy functional groups may be included in an amount of about 0.1 to 10 parts by weight based on 100 parts by weight of the total monomers of the composition.

The adhesive may be a pressure sensitive adhesive (PSA) and may form an adhesive layer, e.g., after being applied and cured.

Hereinafter, an adhesive tape including an adhesive layer including the adhesive as described above will be described with reference to the drawings.

Figure 2:
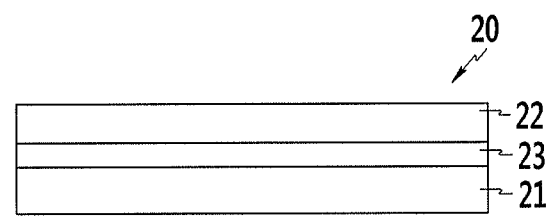
Figure 3:
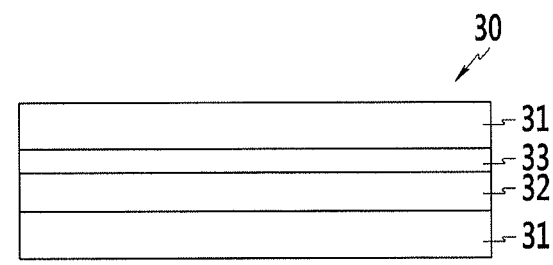

FIGS. 1, 2, and 3 illustrate cross-sectional views of stacked structures of an adhesive tape according to an embodiment.

Referring to FIG. 1, an adhesive tape 10 according to an embodiment may include a substrate layer 12, an adhesive layer 11 formed one side of the substrate layer 12, and a printing layer 13 formed on the other side of the substrate layer 12. In FIG. 1, the printing layer 13 may be formed on top. When the printing layer 13 is black, the adhesive tape may be non-glossy black.

Referring to FIG. 2, an adhesive tape 20 according to another embodiment may include a substrate layer 22, a printing layer 23 formed on one side of the substrate layer 22, and an adhesive layer 21 formed on the other side of the printing layer 23. In FIG. 2, the substrate layer 22 may be formed on top. When the printing layer 23 is black, the adhesive tape 20 may be glossy black.

Referring to FIG. 3, an adhesive tape 30 according to another embodiment may include a substrate layer 32, a printing layer 33 formed on one side of the substrate layer 32, and an adhesive layer 31 positioned on both sides thereof. In FIG. 3, an adhesive layer 31 may be formed on both side of the printed substrate layer 32, such that it can be used as a double-sided tape.

The substrate layers 12, 22, and 32 may be clear films and may be formed of, for example, a thermoplastic or thermal-curing resin such as, e.g., polycarbonate (PC), polymethylmethacrylate (PMMA), polystyrene (PS), or a copolymer thereof, polyethylene terephthalate (PET), polyethylene naphthalate (PEN), polyethersulfone (PES), or a copolymer thereof, an inorganic layer such as glass, or other suitable substrates.

The printing layers 13, 23, and 33 may apply a black color around the substrate layers 12, 22, and 32 and/or print a logo, mark, and the like on one side of the substrate layers 12, 22, and 32. The printing layers 13, 23, and 33 may be black as aforementioned.

The adhesive layers 11, 21, and 31 may be formed by applying the aforementioned adhesive. The adhesive layers 11, 21, and 31 may have a thickness ranging from about 3 μm to about 85 μm, and thus adhesive strength and internal agglomerative strength may be further reinforced.

The adhesive tapes 10, 20, and 30 may have an entire thickness ranging from about 20 μm to about 100 μm.

In FIGS. 1 to 3, the adhesive layers 11, 21, and 31 are illustrated as having a flat surface, but they are not limited thereto, and may have an embossed surface having a plurality of recess portions and/or a plurality of convex portions.

Figure 4:
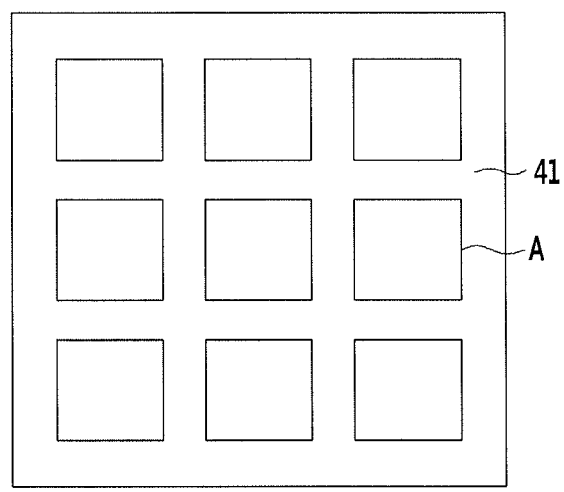
FIG. 4 illustrates a top plan view of an exemplary adhesive layer having an embossed surface.

FIG. 4 illustrates a top plan view of an exemplary adhesive layer having an embossed surface. Referring to FIG. 4, an adhesive layer 41 may have a plurality of convex portions A repeatedly arranged in a predetermined pattern. The pattern illustrated in FIG. 4 is given only by way of example.

Figure 5A:
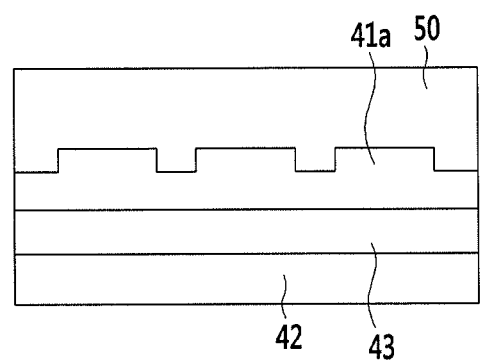
FIG. 5A illustrates a cross-sectional view of an adhesive layer in an adhesive tape during a method of forming an embossed surface on an adhesive layer in accordance with an embodiment.
Figure 5B:
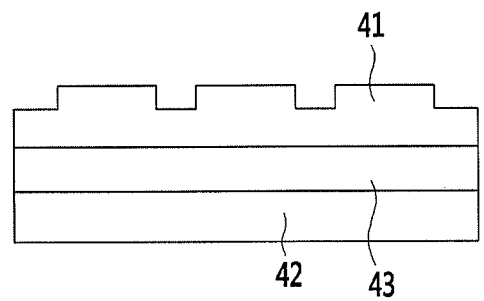
FIG. 5B illustrates a cross-sectional view of an adhesive tape with an embossed surface after being fabricated as illustrated in FIG. 5A.

FIG. 5A illustrates a cross-sectional view of an adhesive layer in an adhesive tape during a method of forming an embossed surface on an adhesive layer in accordance with an embodiment, and FIG. 5B illustrates a cross-sectional view of an adhesive tape with an embossed surface after being fabricated as illustrated in FIG. 5A. Referring to FIG. 5A, an adhesive 41a may be applied on a mold 50 having a predetermined negatively-carved pattern, and then may be dried and cured. Next, a substrate 42 and a printing layer 43 may be sequentially formed on the adhesive 41a and matured at a predetermined temperature (the adhesive layer 41a may also be dried and/or cured after the substrate 42 and printing layer 43 are formed thereon). Then, the mold 50 may be removed, and the adhesive tape may have the adhesive layer 41 having an embossed surface as illustrated in FIG. 5B.

Figure 6A:
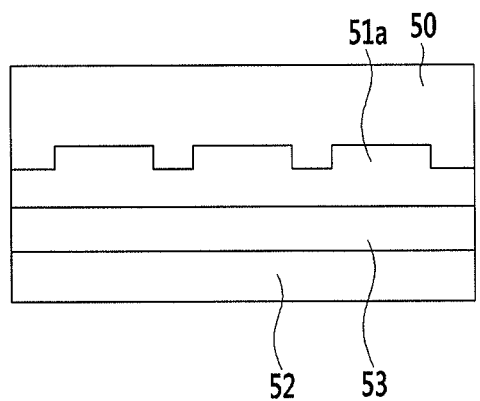
FIG. 6A illustrates a cross-sectional view of an adhesive layer in an adhesive tape during a method of forming an embossed surface on an adhesive layer in accordance with an embodiment.
Figure 6B:
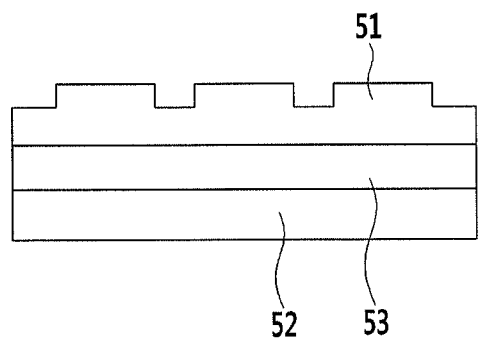
FIG. 6B illustrates a cross-sectional view of an adhesive tape with an embossed surface after being fabricated as illustrated in FIG. 6A.

FIG. 6A illustrates a cross-sectional view of an adhesive layer in an adhesive tape during a method of forming an embossed surface on an adhesive layer in accordance with an embodiment, and FIG. 6B illustrates a cross-sectional view of an adhesive tape with an embossed surface after being fabricated as illustrated in FIG. 6A. Referring to FIG. 6A, an adhesive 51a may be applied on a mold 50 having a predetermined negatively-carved pattern, and then may be dried and cured. Next, a substrate 52 including the printing layer 53 may be laminated on the adhesive 51a, and then the laminated product may be matured at a predetermined temperature (the adhesive layer 51a may also be dried and/or cured after the substrate 52 and printing layer 53 are formed thereon). Then, the mold 50 may be removed, and the adhesive tape may have the adhesive layer 51 having an embossed surface as illustrated in FIG. 6B.

Figure 7A:
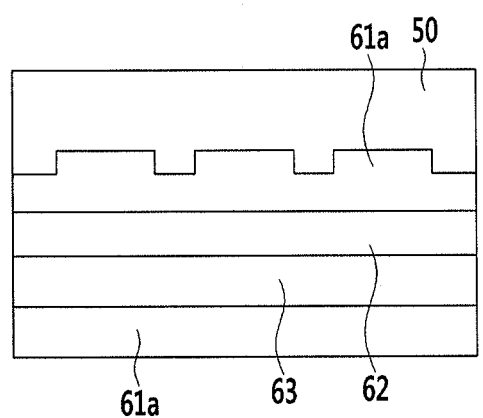
FIG. 7A illustrates a cross-sectional view of an adhesive layer in an adhesive tape during a method of forming an embossed surface on an adhesive layer in accordance with an embodiment.
Figure 7B:
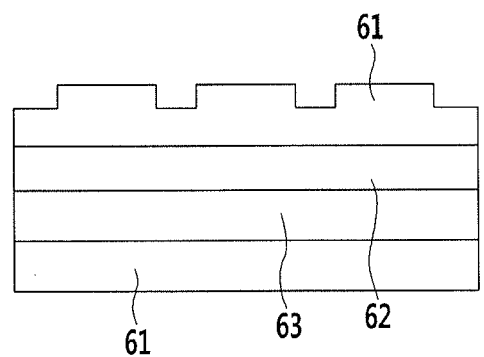
FIG. 7B illustrates a cross-sectional view of an adhesive tape with an embossed surface after being fabricated as illustrated in FIG. 7A.

FIG. 7A illustrates a cross-sectional view of an adhesive layer in an adhesive tape during a method of forming an embossed surface on an adhesive layer in accordance with an embodiment, and FIG. 7B illustrates a cross-sectional view of an adhesive tape with an embossed surface after being fabricated as illustrated in FIG. 7A. Referring to FIG. 7A, an adhesive 61a may be applied on a mold 50 having a predetermined negatively-carved pattern, and then may be dried and cured. Next, a substrate 62 having a printing layer 63 may be laminated on the adhesive 61a, and another adhesive 61a may be applied thereon (the adhesive layer 61a may also be dried and/or cured after the substrate 62 and printing layer 63 are formed thereon). Then, the product having the adhesive 61a applied on both sides may be matured at a predetermined temperature, and the mold 50 may be removed, and the adhesive tape may have the adhesive layer 51 having an embossed surface as illustrated in FIG. 7B. In the drawing, the adhesive layer 61 is illustrated as having only one embossed surface but may have an embossed surface on both sides thereof.

In addition, the drawings illustrate that the mold is negatively carved, but the mold may be either negatively carved or positively carved to form an embossed surface on the adhesive layer.

The adhesive layer may have an embossed surface, and thus may allow for removal of vapors when applied to a display panel, a substrate, or the like, thereby further improving adhesive strength.

The adhesive tape may be applied to a display device.

The display device may be, for example, a liquid crystal display (LCD), a plasma display device, an organic light emitting diode (OLED) display, a field effect display, and an electrophoretic display, but is not limited thereto.

The display device may include a display panel expressing an image, and the adhesive tape may be disposed on the rear side of the display panel.

The display device may be, for example, an organic light emitting diode (OLED) display.

Figure 8:
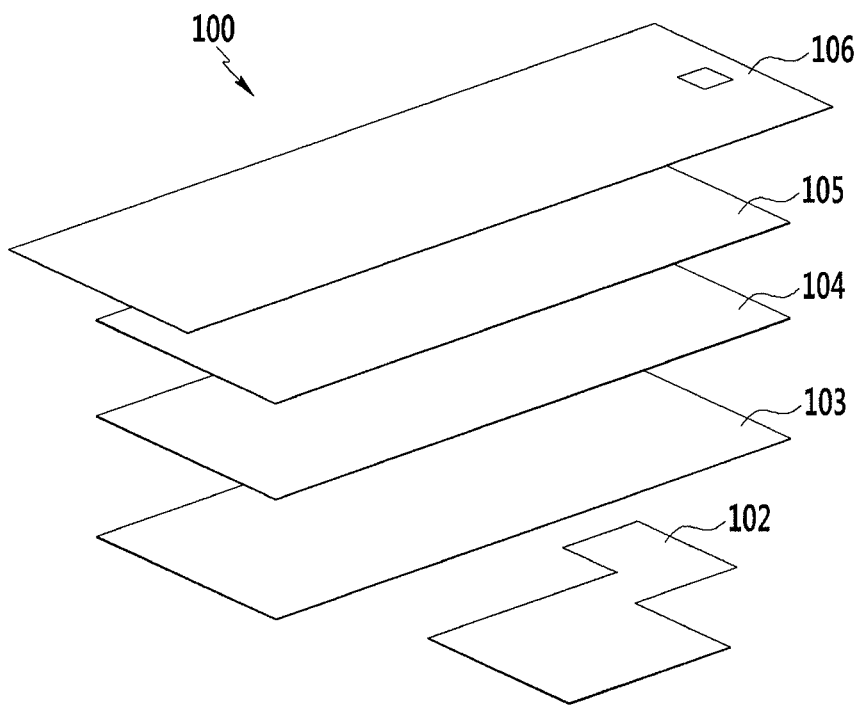
FIG. 8 illustrates an exploded view of an organic light emitting diode (OLED) display according to an embodiment.

FIG. 8 illustrates an exploded view of an organic light emitting diode (OLED) display according to an embodiment.

Referring to FIG. 8, a display device 100 according to an embodiment may include a display panel 104, an adhesive tape 103 positioned on the rear side of the display panel 104, a flexible circuit board 102 positioned on the rear side of the adhesive tape 103, a window 106 positioned on the front side of the display panel 104, and an adhesive 105 adhering the window 106 to the display panel 104.

The display panel 104 may include a substrate, a thin film transistor, an organic emission layer, and the like formed on the substrate. The flexible circuit board (FPC) 102 may be adhered to an adhesive tape 103 through a tape flexible circuit board (tape FPC). The window 106 may formed of glass or plastic, and may have a stacked structure of a plurality of layers. The adhesive 105 may be a clear adhesive tape (OCA) adhering the display panel 104 to the window 106.

The flexible circuit board 102 may be bent (not shown) and disposed on the side of the display panel 104. As aforementioned, the adhesive tape 103 may include the adhesive discussed above, and may have an improved reinforced adhesive strength and internal agglomerative strength, and may prevent the display panel 104 from being detached or delaminated therefrom despite tension consistently applied thereto by the flexible printed circuit (FPC) 102.

Hereinafter, non-limiting exemplary embodiments are discussed in greater detail.

Example 1

2-ethylhexyl acrylate (2-EHA), β-carboxylethyl acrylate, vinyl acetate, itaconic acid, acrylic acid, and 2-hydroxyethyl acrylate in a monomer ratio in the following Table 1 were put into a 500 ml 4-necked flask, and a mixed solvent prepared by mixing toluene, ethyl acetate, and methanol was added thereto in a solvent ratio as shown in the following Table 1. Herein, 0.3 parts by weight of benzoyl peroxide as a thermal initiator was added thereto based on 100 parts by weight of the total monomers.

TABLE 1

|  | Component | Amount based on Monomers and Solvents (wt %) | Amount based on Monomers (wt %) |
|---|---|---|---|
| Monomer | 2-ethylhexylacrylate | 34 | 85 |
|  | β-carboxylethyl acrylate | 2 | 5 |
|  | vinyl acetate | 2.4 | 6 |
|  | itaconic acid | 0.4 | 1 |
|  | acrylic acid | 0.8 | 2 |
|  | 2-hydroxyethyl acrylate | 0.4 | 1 |
|  | Sum of monomers | 40 | 100 |
| Solvent | toluene | 24 |  |
|  | ethyl acetate | 30 |  |
|  | methanol | 6 |  |
|  | Sum of solvent | 60 |  |
| Thermal initiator | benzoyl peroxide | 0.3 parts by weight based on 100 parts of Monomers |  |

Next, the mixture was reacted at 60° C. for 3 hours, thus preparing an adhesive including an acrylic copolymer.

Then, 0.5 parts by weight of an N,N,N',N'-tetraglycidyl-m-xylenediamine compound represented by the following Chemical Formula 2 (ETRAD-X, Mitsubishi Gas Chemical Company, INC., Mw=360.5) as an epoxy-based hardener was added to the acrylic copolymer based on 100 parts by weight of the total monomers, thereby preparing an adhesive.

[Chemical Formula 2]

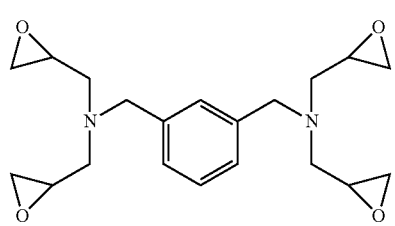

Then, the adhesive was coated to be 10 μm thick on a PET substrate, dried at 80° C., and matured at 50° C. to perform a cross-linking reaction, thereby fabricating an adhesive tape.

As measured using gel permeation chromatography, the adhesive has a number average molecular weight (Mn) of 140,000, a weight average molecular weight (Mw) of 470,000, and a polydispersity index (PI) of 3.36.

Example 2

An adhesive tape was fabricated according to the same method as Example 1, except for using 1 part by weight of an epoxy-based hardener represented by the above Chemical Formula 2 based on 100 parts by weight of the total monomers.

Example 3

An adhesive tape was fabricated according to the same method as Example 1, except for using 2 parts by weight of an epoxy-based hardener represented by the above Chemical Formula 2 based on 100 parts by weight of the total monomers.

Example 4

An adhesive tape was fabricated according to the same method as Example 1, except for using 5 parts by weight of an epoxy-based hardener represented by the above Chemical Formula 2 based on 100 parts by weight of the total monomers.

Example 5

An adhesive tape was fabricated according to the same method as Example 2, except for coating the adhesive to be 5 μm thick on a PET substrate.

Example 6

An adhesive tape was fabricated according to the same method as Example 2 except for coating the adhesive to be 15 μm thick on a PET substrate.

Example 7

An adhesive tape was fabricated according to the same method as Example 2, except for coating the adhesive to be 10 μm thick on a PET substrate and pressing the coated substrate using a negatively-carved mold to form an adhesive layer having a plurality of convex portions thereon (i.e., an embossed surface).

Evaluation 1

The adhesive tapes according to Examples 1 to 5 were evaluated regarding adhesive strength.

The adhesive strength was evaluated for 180° peeling strength by attaching a 25 mm-wide adhesive tape on the respective surfaces of a stainless steel (SUS304) and a PET substrate and rolling a 2 kg rubber roller thereon. The peeling strength was measured at 180° under constant temperature and humidity conditions of 25° C. and relative humidity of 50% using a property analyzer (Texture Analyzer, Stable Micro Systems, TA-XT2i) at a cross-head speed of 300 mm/min.

When an adhesive tape had a peeling strength of greater than or equal to about 500 gf, the adhesive tape was considered to be appropriate.

Figure 9:
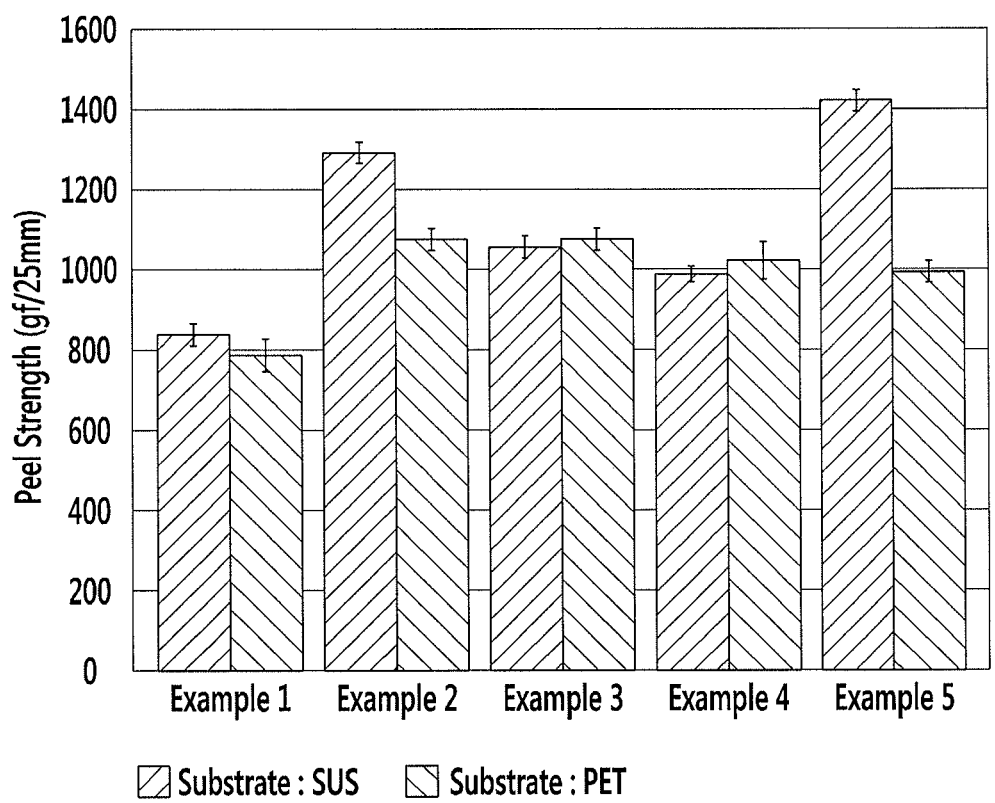
FIG. 9 illustrates a graph of peeling strengths of the adhesive tapes according to Examples 1 to 5.

FIG. 9 illustrates a graph of peeling strengths of the adhesive tapes according to Examples 1 to 5.

Referring to FIG. 9, the adhesive tapes according to Examples 1 to 4 have peeling strength of greater than or equal to about 500 gf when attached to a stainless steel and PET substrate.

Evaluation 2

The adhesive tapes according to Examples 1 to 4 were evaluated regarding initial adhesive strength.

The initial adhesive strength was evaluated by measuring a force to peel off the adhesive tapes at a speed of 60 mm/min after applying 100 gf for one second and another force to peel off the adhesive tapes at a speed of 60 mm/min after applying 500 gf for 3 seconds using a property analyzer (Texture Analyzer, Stable Micro Systems, TA-XT2i).

The adhesive tapes were evaluated to be appropriate when they had an initial adhesive strength of greater than or equal to about 100 gf under a pressure condition of 100 gf/1 sec and greater than or equal to about 500 gf/3 sec under a pressure condition of 300 gf.

Figure 10:
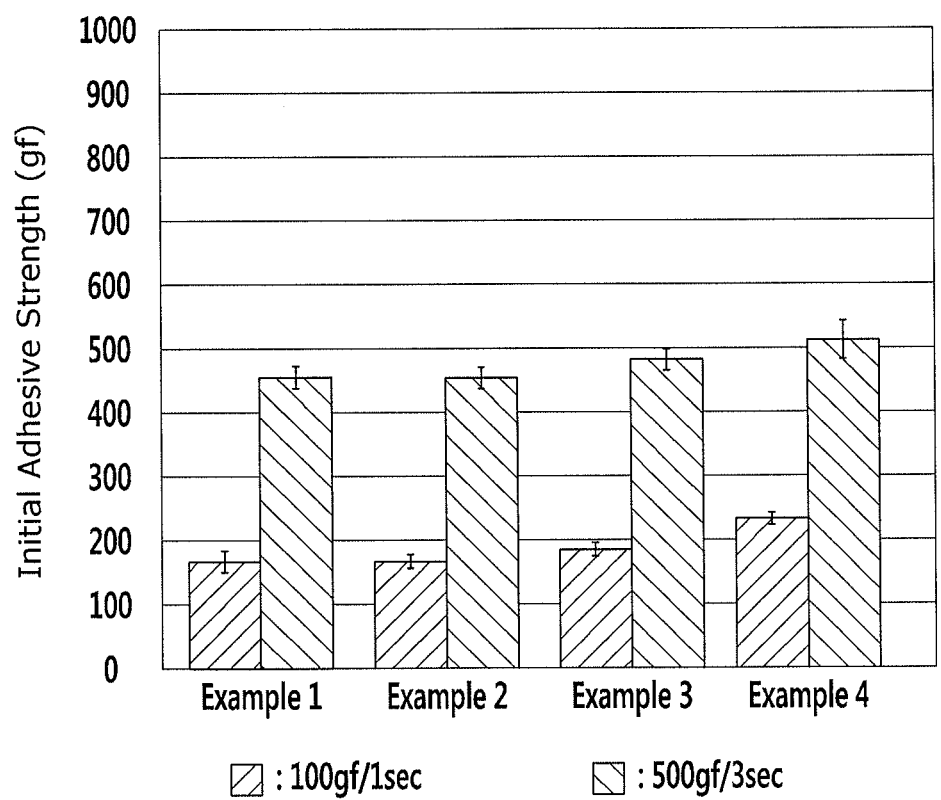
FIG. 10 illustrates a graph of initial adhesive strengths of the adhesive tapes according to Examples 1 to 4.

FIG. 10 illustrates a graph of initial adhesive strengths of the adhesive tapes according to Examples 1 to 4.

Referring to FIG. 10, the adhesive tapes according to Examples 1 to 4 have initial adhesive strengths of greater than or equal to about 100 gf under a pressure condition of 100 gf/1 sec, and greater than or equal to about 300 gf under a pressure condition of 500 gf/3 sec.

Evaluation 3

The adhesive tapes according to Examples 2 to 4 were evaluated regarding holding strength.

The holding strength was measured by hanging weights of 0.5, 1, and 2 kg with the adhesive tape under a condition of 85° C. and measuring how long it takes for the weight to fall.

When the adhesive tapes had a holding strength of greater than or equal to about 2000 minutes, the adhesive tapes were evaluated to be appropriate.

Figure 11:
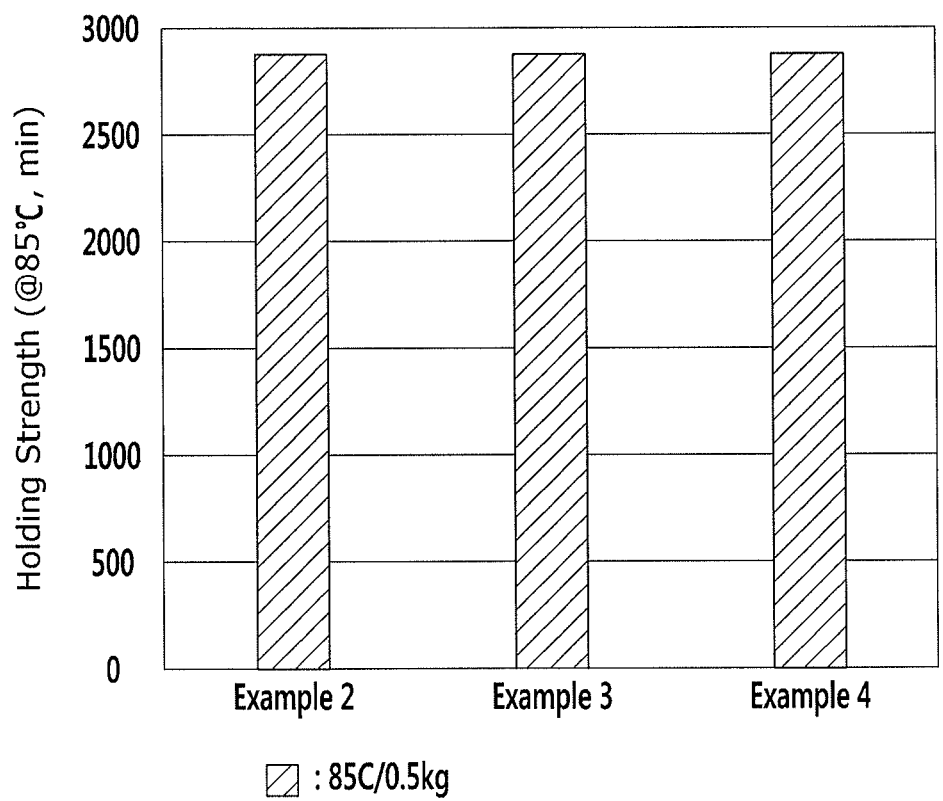
FIG. 11 illustrates a graph of holding strength of the adhesive tapes according to Examples 2 to 4, FIGS. 12, 13, and 14 respectively illustrate adhesive strength, initial adhesive strength, and holding strength of the adhesive tapes according to Examples 5, 2, and 6, and FIGS. 15, 16, and 17 respectively illustrate adhesive strength, initial adhesive strength, and holding strength of the adhesive tape according to Example 7.

FIG. 11 illustrates a graph of holding strength of the adhesive tapes according to Examples 2 to 4.

Referring to FIG. 11, the adhesive tapes according to Examples 2 to 4 have holding strength of greater than or equal to about 2000 minutes.

Evaluation 4

The adhesive tapes were evaluated regarding adhesive strength, initial adhesive strength, and holding strength depending on thickness of an adhesive layer.

The adhesive tapes according to Examples 5, 2, and 6 respectively include 5 μm, 10 μm, and 15 μm thick adhesive layers formed of the same adhesive. The adhesive strength, initial adhesive strength, and holding strength of the adhesive tapes according to Examples 5, 2, and 6 were evaluated according to the same method as Evaluations 1 to 3.

Figure 12:
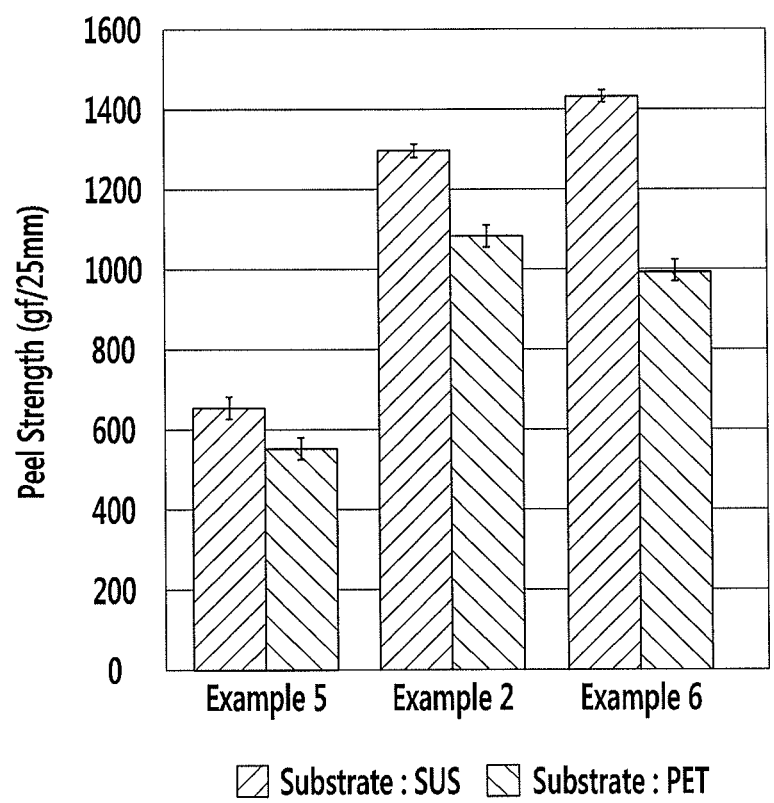
Figure 13:
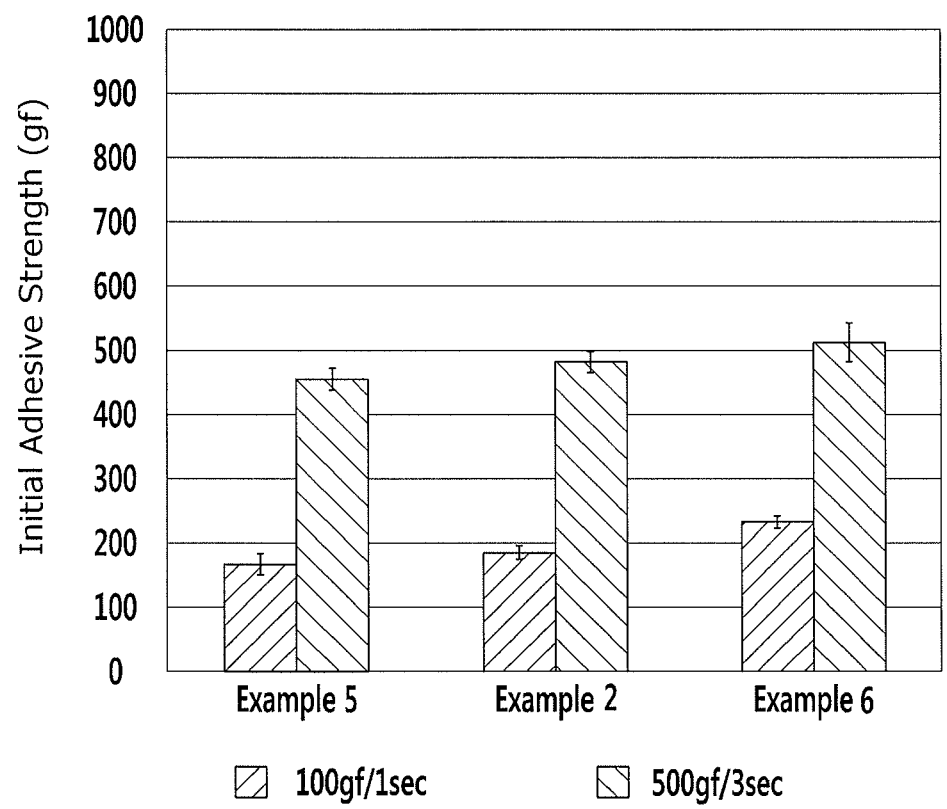
Figure 14:
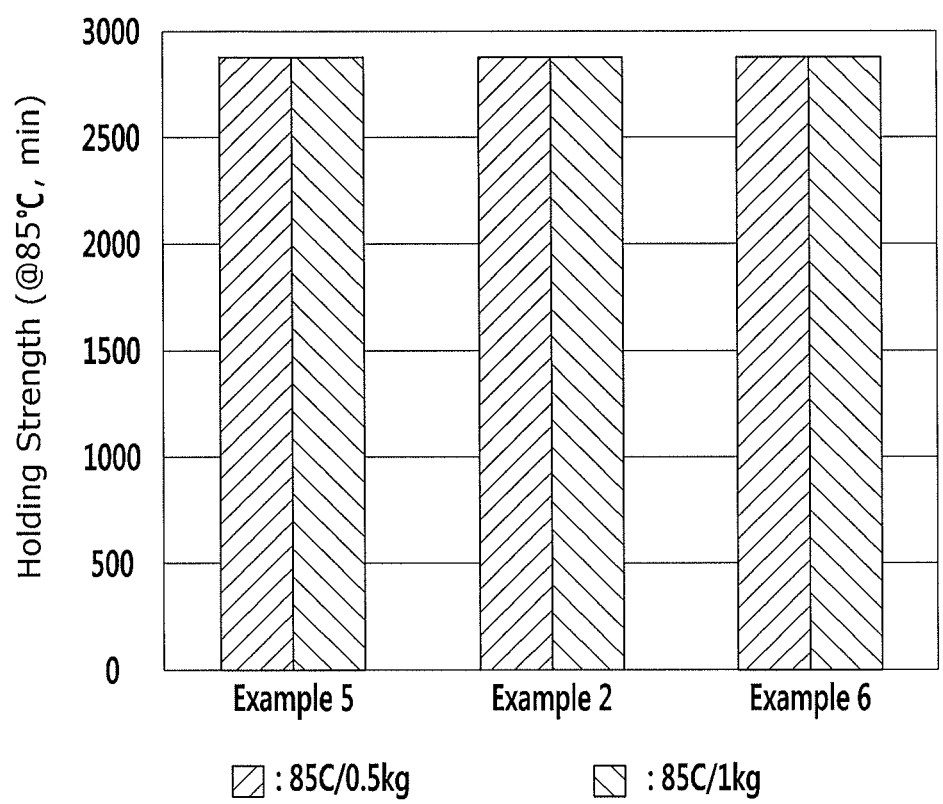

FIGS. 12, 13, and 14 illustrate graphs of adhesive strength, initial adhesive strength, and holding strength of the adhesive tapes according to Examples 5, 2, and 6.

Referring to FIG. 12, the adhesive tapes according to Example 5, 2, and 6 have a peeling strength of greater than or equal to about 500 gf regardless of the thickness of the adhesive layers.

Referring to FIG. 13, the adhesive tapes according to Example 5, 2, and 6 have an initial adhesive strength of greater than or equal to about 100 gf under the pressure condition of 100 gf/1 sec and greater than or equal to about 300 gf under the pressure condition of 500 gf/3 sec, regardless of the thickness of the adhesive layers. Notably, higher adhesive strength was observed for the thicker adhesive layers.

Referring to FIG. 14, the adhesive tapes according to Examples 5, 2, and 6 have a holding strength of greater than or equal to about 2000 minutes regardless of the thickness of the adhesive layers.

Evaluation 5

The adhesive tape according to Example 7 was evaluated regarding adhesive strength, initial adhesive strength, and holding strength.

The adhesive strength, initial adhesive strength, and holding strength were evaluated according to the same methods as Evaluations 1 to 3, except that the portion of the adhesive tape according to Example 7 having convex portions (i.e., the embossed surface) was measured separately from the portion of the adhesive tape according to Example 7 that lacks convex portions (i.e., non-embossed surface).

Figure 15:
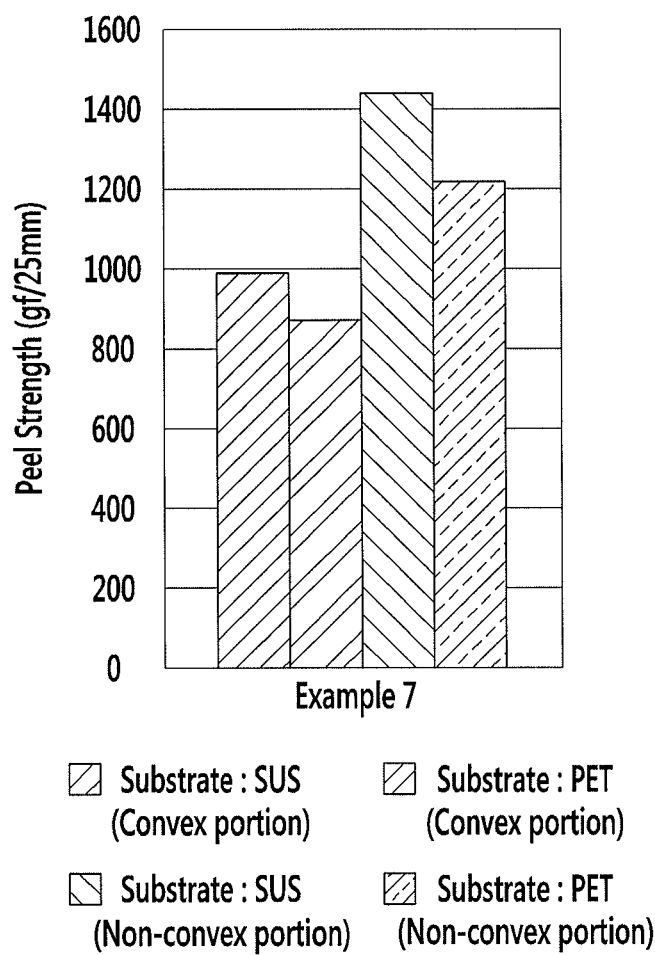
Figure 16:
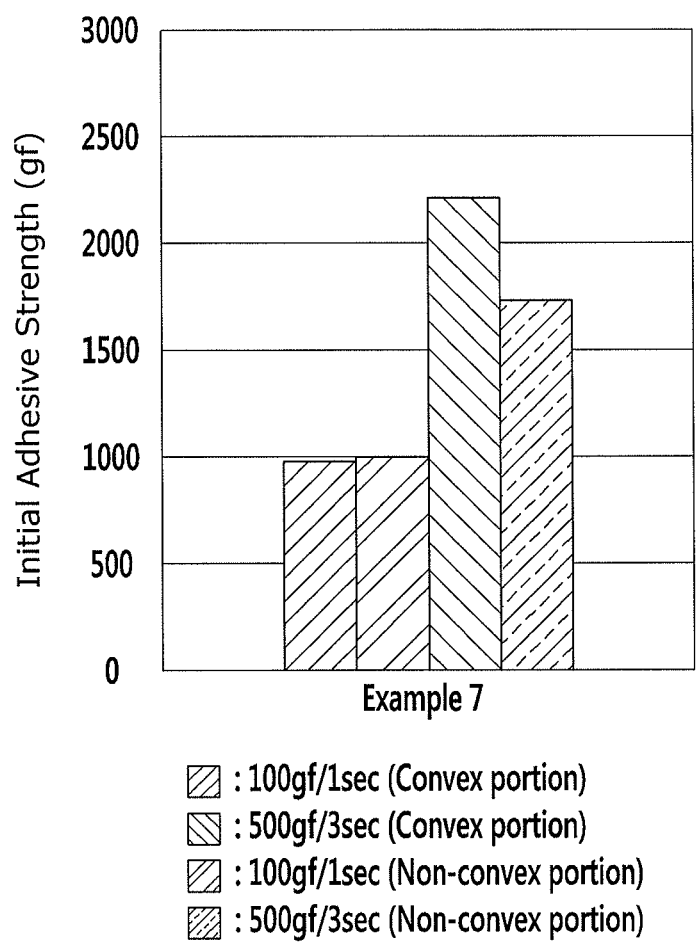
Figure 17:
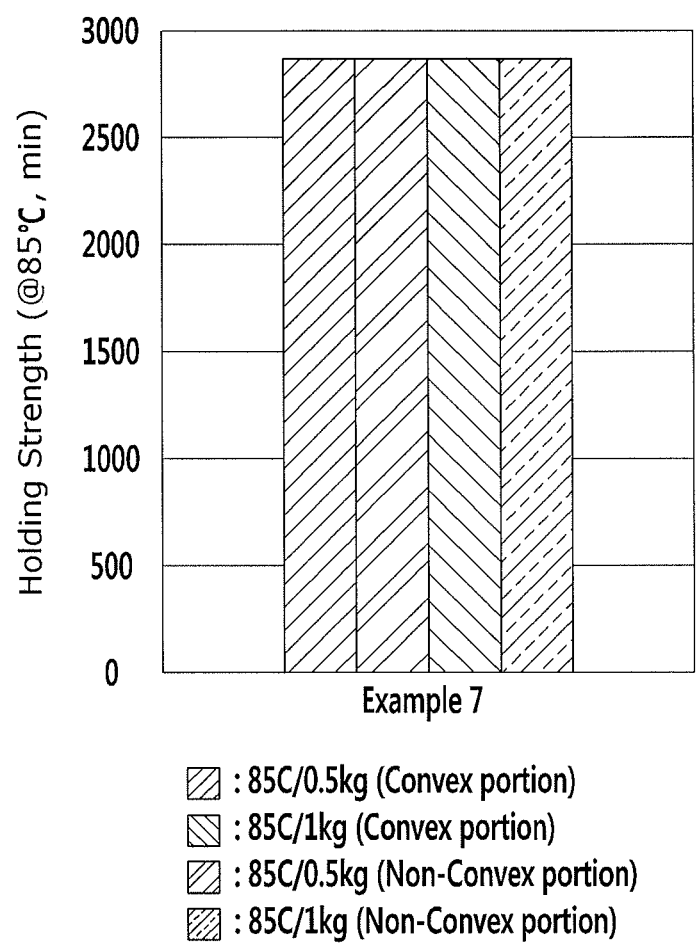

FIGS. 15, 16, and 17 illustrate graphs of adhesive strength, initial adhesive strength, and holding strength of the adhesive tape according to Example 7.

Referring to FIG. 15, the adhesive tape according to Example 7 has a peeling strength of greater than or equal to about 500 gf regardless of convex portions and non-convex portions on the surface.

Referring to FIG. 16, the adhesive tape according to Example 7 has an initial adhesive strength of greater than or equal to about 100 gf under a pressure condition of 100 gf/1 sec and an initial adhesive strength of greater than or equal to about of 300 gf under a pressure condition of 500 gf/3 sec, regardless of convex portions and non-convex portions on the surface.

Referring FIG. 17, the adhesive tape according to Example 7 has a holding strength of greater than or equal to about 2000 minutes regardless of convex portions and non-convex portions on the surface.

By way of summary and review, a display device may include a liquid crystal display (LCD), a plasma display panel (PDP), an organic light emitting diode device (OLED), a field effect display (FED), an electrophoretic display device, and so on. The display device may include a display panel expressing an image, a rear-side adhesive tape disposed on the rear side of the display panel, a flexible printed circuit (FPC) positioned on the rear side of the display panel and controlling operation of the display panel and supplying the display panel with electricity, and a flexible printed circuit (FPCB) electrically connecting the display panel to the flexible printed circuit (FPC). However, there may be a consistent bending tension applied to the flexible printed circuit (FPC), e.g., if the flexible printed circuit (FPC) is bent on the side of the display panel. This consistent bending tension may cause the display panel to separate from the rear-side adhesive tape.

The foregoing conditions may be avoided by using the adhesive/adhesive tape disclosed herein, which may have excellent adhesive strength and internal agglomerative strength, and thus may substantially prevent the adhesive layer from being detached or delaminated, even under conditions of consistent bending tension.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive, comprising:
    an acrylic copolymer synthesized from a composition including:
        a solution polymerizable acryl-based monomer,
        a vinyl-based monomer that is copolymerizable with the solution polymerizable acryl-based monomer,
        a β-carboxylethyl acrylate monomer, the β-carboxylethyl acrylate monomer including a compound represented by Chemical Formula 1:

[Chemical Formula 1]

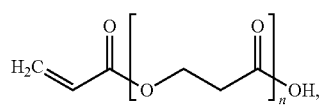

n being an integer ranging from 2 to 12, and
a reaction initiator; and
a compound including at least three epoxy functional groups,
the compound including at least three epoxy functional groups including an N,N,N',N'-tetraglycidyl-m-xylenediamine compound represented by Chemical Formula 2:

[Chemical Formula 2]

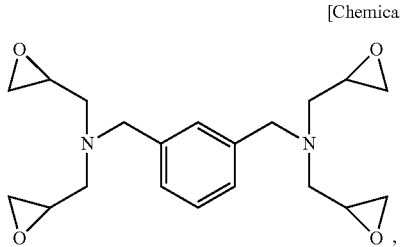

wherein:
the β-carboxylethyl acrylate monomer is included in an amount of about 2 to about 8 parts by weight based on 100 parts by weight of a total amount of monomers,
the compound including at least three epoxy functional groups is included in an amount of about 0.5 to about 5 parts by weight based on 100 parts by weight of a total amount of monomers,
the solution polymerizable acryl-based monomer is included in an amount of about 82 to less than 88 parts by weight based on 100 parts by weight of a total amount of monomers,
the vinyl-based monomer is included in an amount of about 9 to about 10 parts by weight based on 100 parts by weight of a total amount of monomers, and
the reaction initiator is included in an amount of about 0.3 to about 5 parts by weight based on 100 parts by weight of a total amount of monomers.

2. The adhesive as claimed in claim 1, wherein the β-carboxylethyl acrylate monomer includes a first β-carboxylethyl acrylate monomer represented by Chemical Formula 1 and a second β-carboxylethyl acrylate monomer represented by Chemical Formula 1, and the first and second β-carboxylethyl acrylate monomers have different values for n.

3. The adhesive as claimed in claim 1, wherein the solution polymerizable acryl-based monomer includes 2-ethylhexyl acrylate, 2-methylbutyl acrylate, isooctyl acrylate, lauryl acrylate, n-butyl acrylate, n-hexyl acrylate, n-octyl acrylate, n-decyl acrylate, isodecyl acrylate, or a combination thereof.

4. The adhesive as claimed in claim 3, wherein the vinyl-based monomer includes vinyl acetate, ethyl acrylate, methyl methacrylate, styrene, (meth)acrylic acid, hydroxyl ethyl acrylate, (meth)acrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, N-octyl acrylamide, itaconic acid, crotonic acid, maleic acid, fumaric acid, 2,2-(diethoxy)ethyl acrylate, 2-hydroxyethyl (meth)acrylate, 3-hydroxypropyl (meth)acrylate, methyl (meth)acrylate, isobornyl acrylate, 2-(phenoxy)ethyl (meth) acrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, or a combination thereof.

5. The adhesive as claimed in claim 4, wherein the composition includes 2-ethylhexyl acrylate (2-EHA), β-carboxylethyl acrylate, vinyl acetate, itaconic acid, acrylic acid, and 2-hydroxyethyl acrylate.

6. The adhesive as claimed in claim 1, wherein the acrylic copolymer has a weight average molecular weight of about 500,000 to about 1,500,000.

7. An adhesive tape, comprising an adhesive layer formed of the adhesive as claimed in claim 1.

8. The adhesive tape as claimed in claim 7, further comprising a substrate layer, a printing layer, or a combination thereof beneath or on the adhesive layer.

9. The adhesive tape as claimed in claim 7, wherein the adhesive layer has an embossed surface.

10. The adhesive tape as claimed in claim 7, wherein the adhesive layer has a thickness ranging from about 5 μm to about 15 μm, and the adhesive tape has a total thickness ranging from about 20 μm to about 100 μm.

11. The adhesive tape as claimed in claim 7, wherein the adhesive layer has a peeling strength of greater than or equal to about 500 gf.

12. The adhesive tape as claimed in claim 7, wherein the adhesive layer has an initial adhesive strength of greater than or equal to about 100 gf under a pressure condition of about 100 gf/1 sec, and greater than or equal to about 300 gf under a pressure condition of about 500 gf/3 sec.

13. A display device, comprising:
   a display panel; and
   the adhesive tape as claimed in claim 7 on one side of the display panel.

14. The display device as claimed in claim 13, wherein the adhesive tape is positioned on a rear side of the display panel.

15. The display device as claimed in claim 13, wherein the display device is an organic light emitting diode (OLED) display.

* * * * *